Nov. 29, 1966 R. T. ADAMS 3,289,084
SYSTEM FOR GENERATING PHASE COHERENT SIGNALS AT REMOTELY LOCATED STATIONS
Filed Sept. 16, 1963
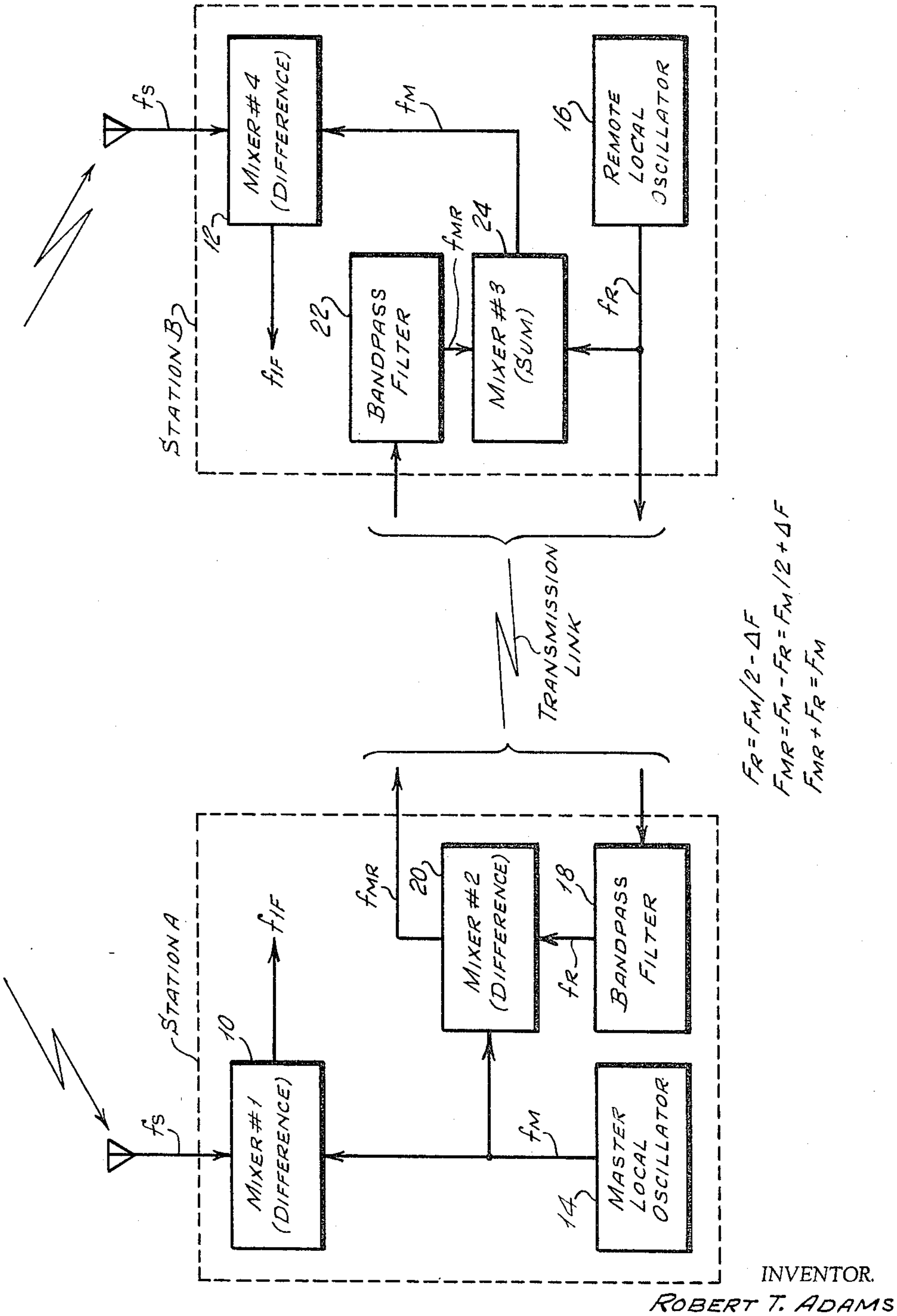
INVENTOR.
ROBERT T. ADAMS
BY Hopgood and Calimafde
ATTORNEYS United States Patent Office 3,289,084

Patented Nov. 29, 1966

3,289,084

SYSTEM FOR GENERATING PHASE COHERENT SIGNALS AT REMOTELY LOCATED STATIONS

Robert T. Adams, Short Hills, N.J., assignor, by mesne assignments, to Communication Systems, Incorporated, Carson City, Nev., a corporation of Nevada Filed Sept. 16, 1963, Ser. No. 309,033
6 Claims. (Cl. 325—63)

This invention relates to an oscillator system in which the phase of an oscillator signal is maintained constant at a plurality of physically separated locations. The invention is characterized by novel means for eliminating the phase shift that would ordinarily occur when the oscillator signal is transmitted from one location to another. The invention is useful in multistatic radar systems, interferometer systems, radio triangulation systems, distance measuring systems, and in many other coherent communication systems which require phase synchronization at two or more separated locations.

It is often necessary to synchronize frequency sources at widely separated locations. This synchronization, however, is complicated by the fact that radio frequency signals undergo a phase shift when they are transmitted from one location to another. It is further complicated by the fact that the exact amount of phase shift varies in accordance with weather conditions for any given transmission line or radio link. In the past, frequency sources at two separate locations have been approximately synchronized by using a phase shifter at one location to compensate for the average phase shift in the transmission link between the two locations. This method of synchronization, however, requires that the phase shift must be measured or calculated for each different installation, and that the compensating phase shift must be adjusted to fit each different installation. In addition, the prior art method does not take into account variations of temperature, humidity, and other environmental factors that affect the phase shift.

Accordingly, one object of this invention is to provide a phase coherent oscillator system in which the phase of an oscillator signal is maintained constant at a plurality of separate locations independent of the distance separating the locations and the transmission link connecting the locations.

Another object of this invention is to provide a phase coherent oscillator system in which the phase of an oscillator signal is maintained constant at a plurality of separate locations independent of variations in temperature, humidity, and other variable factors that effect phase shift in the transmission link connecting the locations.

A further object of this invention is to provide a phase coherent oscillator system which is more accurate than those heretofore known in the art.

An additional object of this invention is to provide a phase coherent oscillator system which is simpler and more reliable than those heretofore known in the art.

Other objects and advantages of the invention will be apparent to those skilled in the art from the following description of one illustrative embodiment thereof, as illustrated in the attached drawing, in which:

The figure is a block diagram of one embodiment of the invention.

In general terms, the above noted objects are accomplished by using a two way transmission link to carry the oscillator signal from one location to another and utilizing the phase shift in one transmission to cancel out the phase shift in the other transmission. This can be better understood with reference to the figure, which shows a pair of physically separated stations A and B that receive a common input signal $f_s$. In this particular embodiment, the input signals are mixed with a local oscillator signal in mixers 10 and 12 to produce respective IF signals at a common intermediate frequency $F_{IF}$. Mixer 10 receives its local oscillator input signal $F_M$ directly from a master local oscillator 14, but mixer 12 receives its local oscillator signal via a two way transmission link that cancels out any phase shift in the transmission. A remote local oscillator 16 is provided in station B to generate a signal whose frequency $F_R$ is equal to $F_M/2-\Delta F$, where $F_M$ is the frequency of master local oscillator 14 and $\Delta F$ is a small, fixed difference frequency. The output of remote local oscillator 16 is communicated from station B to station A via a transmission link, which can be an RF transmission line, or a radio link, or any other suitable transmission means. At station A, frequency $F_R$ is separated out of the transmission link by a bandpass filter 18 and applied to the input terminal of a difference mixer 20, which also receives an input $F_M$ from master local oscillator 14. Difference mixer 20 produces an output signal whose frequency $F_{MR}$ is equal to $$F_M-F_R=F_M/2+\Delta F$$

The output frequency $F_{MR}$ of difference mixer 20 is transmitted via the transmission link to station B, where it is separated from frequency $F_R$ by a bandpass filter 22 and applied to a sum mixer 24, which also receives an input $F_R$ from remote local oscillator 16. Mixer 24 forms the sum $F_R+F_M$, which is equal to $$F_M/2+\Delta F+F_M/2-\Delta F$$

which is simply $f_M$. The output of sum mixer 24 is applied to difference mixer 12, which produces the IF signal $f_{IF}$ at station B.

From the foregoing description, it will be apparent that the local oscillator signals applied to difference mixers 10 and 12 are equal in frequency. The following mathematical analysis will show that the signals are also in phase with each other:

$[\phi]$=an arbitrary phase constant,
$[\alpha]$=the phase shift in the transmission link at $F_R$,
$[\beta]$=the phase shift in the transmission link at $F_{MR}$.

Since master local oscillator 14 is the reference frequency, its phase angle is zero. Let the phase angle of remote local oscillator 16 be $[\phi]$. Then the phase of $F_R$ at the input to mixer 20 will be $[\phi-\alpha]$. Mixing $F_R$ with $F_M$ and taking the lower sideband yields: (In the following, the symbols $F_M$, $F_R$, etc., denote voltages at these frequencies. The phase angles shown in square brackets [ ], indicate the phase angle associated with each voltage).

$$F_M[0]F_R[\phi-\alpha]=F_M[0]-\left\{\left(\frac{FM}{2}-\Delta F\right)[\phi-\alpha]\right\}$$
$$=(F_M/2+\Delta F)[\alpha-\phi]=F_{MR}[\alpha-\phi]$$

After transmission and filtering, the phase of $F_{MR}$ at the input to mixer 24 is $[\alpha-\phi-\beta]$. Mixing $F_{MR}$ with $F_R$ and taking the upper sideband yields:

$$F_R(\phi)+F_{MR}[\alpha-\phi-\beta]=[(F_M-\Delta F)[\phi]$$
$$+\left\{\left(\frac{FM}{2}+\Delta F\right)[\alpha-\phi-\beta]\right\}=F_M(\alpha-\beta)$$

for relatively small values of $\Delta f$, $\alpha$ and $\beta$ will be approximately equal, which means that the phase will be nearly zero at the output of mixer 24. Therefore, the phase of $F_M$ is the same at the input to IF mixers 10 and 12.

From the foregoing analysis it will be apparent that the fixed difference frequency $\Delta F$ is used to separate the frequencies $F_R$ and $F_{MR}$ in the transmission link. If this difference frequency were not used, $F_R$ and $F_{MR}$ would both be equal to $F_M/2$, which means that it would be impossible to distinguish one frequency from the other unless separate transmission lines were used. It should also be noted that the phase shift of the transmission line varies with frequency, which means that $\Delta F$ should be kept as small as possible in installations where a high degree of accuracy is desired. In most instances, however, the difference of phase shift at frequencies $F_R$ and $F_{MR}$ will be entirely negligible. In cases where the IF signal of station B is transmitted to station A, it is preferable to set $\Delta F$ equal to ½ the IF frequency. This produces a phase shift error that is equal and opposite to the phase shift the IF signal will undergo in transit.

The two station circuit shown in the figure can be easily generalized to include any desired number of stations by simply providing a separate difference mixer and bandpass filter in master station A for each additional remote station. It should be noted, too, that no adjustments or calculations are necessary to compensate for differences of distance between the various stations, since the phase shift angles $\alpha$ and $\beta$ will be approximately equal regardless of the length of the transmission line, and regardless of the temperature, humidity, and other environmental factors.

From the foregoing description it will be apparent that this invention provides a phase coherent oscillator system in which the phase of an oscillator signal is maintained constant at a plurality of separate locations independent of the distance separating the locations and the transmission link connecting the locations. It will also be apparent that this invention provides a phase coherent oscillator system in which the phase of an oscillator signal is maintained constant at a plurality of separate locations independent of variations in temperature, humidity, and other variable factors that effect phase shift in the transmission link connecting the locations. And it should be understood that this invention is by no means limited to the specific embodiment disclosed herein, since many modifications can be made without departing from the basic teaching of this application. Accordingly, this invention includes all modifications falling within the scope of the following claims.

I claim:

1. A phase coherent oscillator system for remotely located oscillators comprising: a master oscillator for producing a signal having a frequency $F_M$; a remote oscillator for producing a signal having a frequency $F_R$, where $F_R$ is a function of $F_M$; a two-way transmission link coupling the separate oscillator locations, said link imparting substantially equal phase shifts to signals transmitted in either direction; means for transmitting the remote oscillator signal $F_R$ through said link to the location of said master oscillator; means at the location of said master oscillator coupled to said link and to said master oscillator for combining signals $F_R$ and $F_M$ and transmitting the combined signal through said link to the remote oscillator location; and means at the location of said remote oscillator coupled to said link and to said remote oscillator for combining $F_R$ and the transmitted signal of the first-mentioned combining means to derive $F_M$.

2. The phase coherent oscillator system claimed in claim 1 wherein $F_R$ equals $F_M/2$.

3. The phase coherent oscillator system claimed in claim 2, wherein each of said combining means comprises a mixer circuit and wherein the mixer circuit coupled to said master oscillator is a subtraction circuit and the mixer circuit coupled to said remote oscillator is an addition circuit.

4. The phase coherent oscillator system claimed in claim 1, wherein $F_R$ equals $F_M/2-\Delta F$.

5. The phase coherent oscillator system claimed in claim 4, further comprising a first band pass filter coupled between the first mentioned combining means and said transmission link and a second band pass filter coupled between the second mentioned combining means and said transmission link.

6. The phase coherent oscillator system claimed in claim 4, wherein each of said combining means comprises a mixer circuit and wherein the mixer circuit coupled to said master oscillator is a subtraction circuit and the mixer circuit coupled to said remote oscillator is an addition circuit.

References Cited by the Examiner

UNITED STATES PATENTS

| | | | |
|---|---|---|---|
| 2,093,871 | 9/1937 | Levin | 325—432 |
| 2,293,595 | 8/1942 | Cowan | 333—31 |
| 3,089,092 | 5/1963 | Plotkin et al. | 331—38 X |
| 3,128,465 | 4/1964 | Brilliant | 325—58 |
| 3,230,453 | 1/1966 | Boor et al. | 325—67 |

DAVID G. REDINBAUGH, *Primary Examiner.*

B. V. SAFOUREK, *Assistant Examiner.*